US012717422B2

(12) United States Patent
Yoon et al.

(10) Patent No.: US 12,717,422 B2
(45) Date of Patent: Aug. 25, 2026

(54) PRESSURE SENSOR, SMART PAD INCLUDING THE SAME AND DISPLAY SYSTEM

(71) Applicant: LG ELECTRONICS INC., Seoul (KR)

(72) Inventors: Hyung Yoon, Seoul (KR); Taegu Kang, Seoul (KR); Wonkyu Song, Seoul (KR); Hyungyu Park, Seoul (KR); Homin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/011,973

(22) Filed: Jan. 7, 2025

(65) Prior Publication Data

US 2025/0224815 A1 Jul. 10, 2025

(30) Foreign Application Priority Data

Jan. 8, 2024 (KR) ........................ 10-2024-0003180

(51) Int. Cl.
*G06F 3/02* (2006.01)

(52) U.S. Cl.
CPC .................................. *G06F 3/0202* (2013.01)

(58) Field of Classification Search
CPC .... G06F 3/0202; G06F 3/0233; G06F 3/0346; G06F 3/03547; G06F 3/038; G06F 3/04144; G06F 2203/04105; H03K 2017/9755; H03K 2217/9651; H03K 17/975; G01L 1/142
See application file for complete search history.

(56) References Cited

U.S. PATENT DOCUMENTS

2007/0186667 A1* 8/2007 Deangelis ............ G01D 5/2405 73/780
2017/0347021 A1* 11/2017 Kawai .................... H04N 23/66
2022/0397467 A1 12/2022 Ide et al.

FOREIGN PATENT DOCUMENTS

WO WO 2014/204323 A1 12/2014

* cited by examiner

*Primary Examiner* — Amit Chatly
(74) *Attorney, Agent, or Firm* — Birch, Stewart, Kolasch & Birch, LLP

(57) ABSTRACT

A pressure sensor, a smart pad including the same, and a display system are disclosed. A pressure sensor according to at least one of various embodiments of the present disclosure may include a first electrode; a second electrode formed at a position corresponding to the first electrode; a third electrode formed between the first electrode and the second electrode; and a fourth electrode formed on at least one end of the third electrode.

9 Claims, 11 Drawing Sheets

Figure 7:
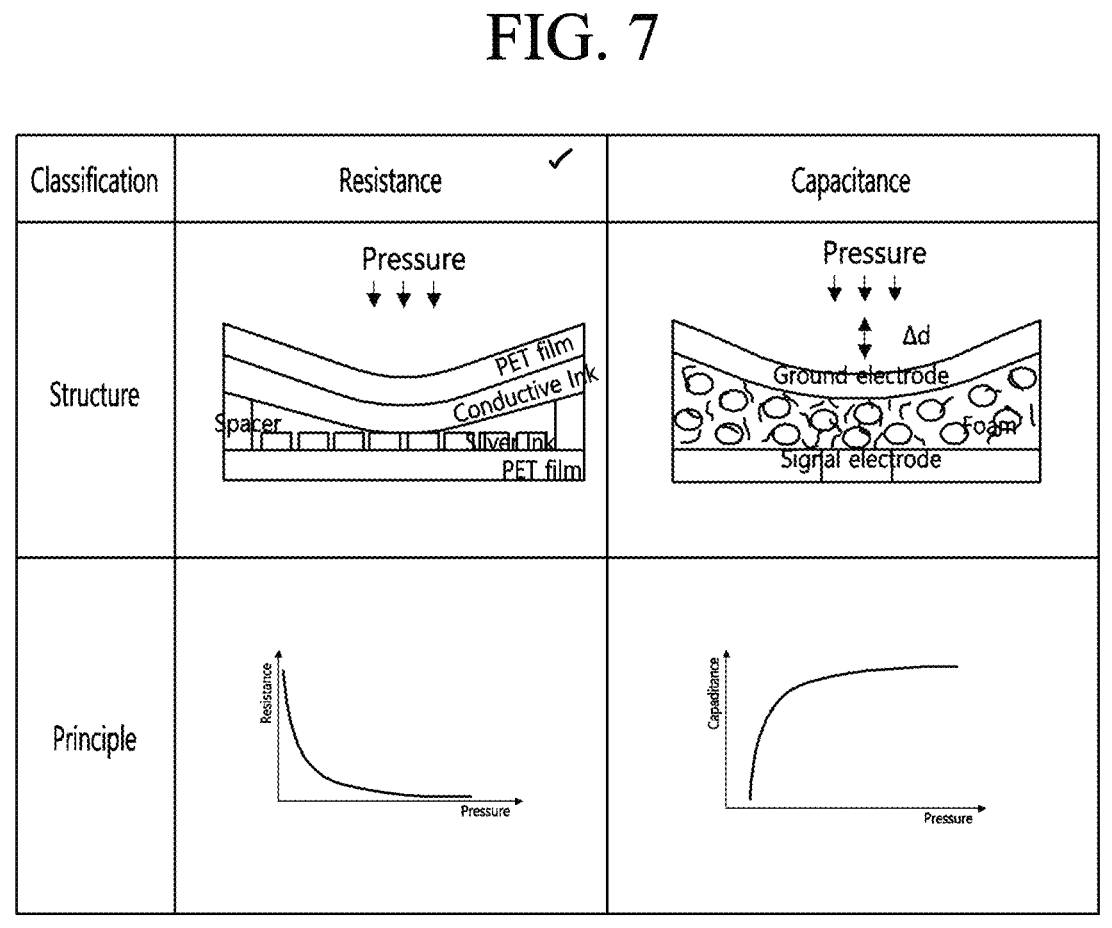

| Classification | Resistance ✓ | Capacitance |
| --- | --- | --- |
| Structure | Pressure<br>PET film<br>Conductive Ink<br>Spacer<br>Silver Ink<br>PET film | Pressure<br>Δd<br>Ground electrode<br>Foam<br>Signal electrode |
| Principle | Resistance<br>Pressure | Capacitance<br>Pressure |

(a)

(b)

Electrode

Insulator (Dielectric)

Electrode

- $C = \varepsilon^*(A/d)$

C: Capacitance
ε: Dielectric constant
A: Area
d: distance (a)

(b)

PRESSURE SENSOR, SMART PAD INCLUDING THE SAME AND DISPLAY SYSTEM

CROSS-REFERENCE TO RELATED APPLICATION(S)

Pursuant to 35 U.S.C. § 119(a), this application claims the benefit of earlier filing date and right of priority to Korean Patent Application No. 10-2024-0003180, filed on Jan. 8, 2024, the contents of which are hereby incorporated by reference herein in its entirety.

BACKGROUND OF THE INVENTION

Field of the Invention

The present disclosure relates to a pressure sensor, a smart pad including the same, and a display system.

Discussion of the Related Art

Recently, the functions of display devices have been diversified, and for example, there are functions for data and voice communication, taking pictures and videos using a camera, recording voice, playing music files using a speaker system, and outputting images or videos to a display.

Some display devices have an added electronic game play function or perform a multimedia player function.

As the functions of such display devices have been diversified, they are being implemented in the form of multimedia players with complex functions such as taking pictures or videos, playing music or video files, playing games, and receiving broadcasts.

SUMMARY OF THE INVENTION

An object of the present disclosure is to provide a display system including a pressure sensor that performs more accurate pressure sensing by minimizing noise, a smart pad including the pressure sensor, and a display device that communicates with and processes the smart pad.

A pressure sensor according to at least one of the various embodiments of the present disclosure may include a first electrode; a second electrode formed at a position corresponding to the first electrode; a third electrode formed between the first electrode and the second electrode; and a fourth electrode formed at at least one end of the third electrode.

The third electrode according to at least one of the various embodiments of the present disclosure may be a multi-channel signal electrode.

The fourth electrode according to at least one of the various embodiments of the present disclosure may be a ground electrode.

The pressure sensor may further include a fifth electrode connecting one end of the first electrode and one end of the second electrode according to at least one of the various embodiments of the present disclosure.

The fifth electrode according to at least one of the various embodiments of the present disclosure may be in contact with the fourth electrode in accordance with a pressure direction.

A dielectric may be formed between the first electrode and the third electrode and between the second electrode and the third electrode, respectively, according to at least one of the various embodiments of the present disclosure.

The first electrode and the second electrode according to at least one of the various embodiments of the present disclosure may be formed through a conductive fabric.

A smart pad according to at least one of the various embodiments of the present disclosure may include a pressure sensor which comprises a first electrode; a second electrode formed at a position corresponding to the first electrode; a third electrode formed between the first electrode and the second electrode; and a fourth electrode formed on at least one end of the third electrode of the pressure sensor.

The third electrode according to at least one of the various embodiments of the present disclosure may be a multi-channel signal electrode.

The fourth electrode according to at least one of the various embodiments of the present disclosure may be a ground electrode.

The pressure sensor in the smart pad may further include a fifth electrode connecting one end of the first electrode and one end of the second electrode according to at least one of the various embodiments of the present disclosure.

The fifth electrode according to at least one of the various embodiments of the present disclosure may be in contact with the fourth electrode in accordance with the pressure direction.

A dielectric may be formed between the first electrode and the third electrode and between the second electrode and the third electrode according to at least one of the various embodiments of the present disclosure.

The first electrode and the second electrode according to at least one of the various embodiments of the present disclosure may be formed through a conductive fabric.

A display system according to at least one of the various embodiments of the present disclosure may include a smart pad which comprises a pressure sensor, a first electrode, a second electrode formed at a position corresponding to the first electrode, a third electrode formed between the first electrode and the second electrode, and a fourth electrode formed on at least one end of the third electrode. The display system may also include a display device configured to process and output a signal obtained from the smart pad.

According to at least one of the various embodiments of the present disclosure, there is an effect of performing more accurate pressure sensing by suppressing or minimizing noise generation due to pressure.

According to at least one of the various embodiments of the present disclosure, there is an effect of protecting the pressure sensor from electrostatic discharge (ESD), etc., thereby extending the product lifespan and improving reliability.

According to at least one of the various embodiments of the present disclosure, there is an effect of increasing the user's satisfaction with the product by deriving accurate results corresponding to the user's movement through accurate pressure sensing.

BRIEF DESCRIPTION OF THE DRAWINGS

FIG. 7 is a drawing for explaining the type of a pressure sensor.

DETAILED DESCRIPTION OF THE PREFERRED EMBODIMENTS

Hereinafter, embodiments related to the present disclosure will be described in more detail with reference to the drawings. The suffixes "module" and "unit" for components used in the following description are given or used interchangeably only for the convenience of writing the specification, and do not have distinct meanings or roles in themselves.

Figure 1:
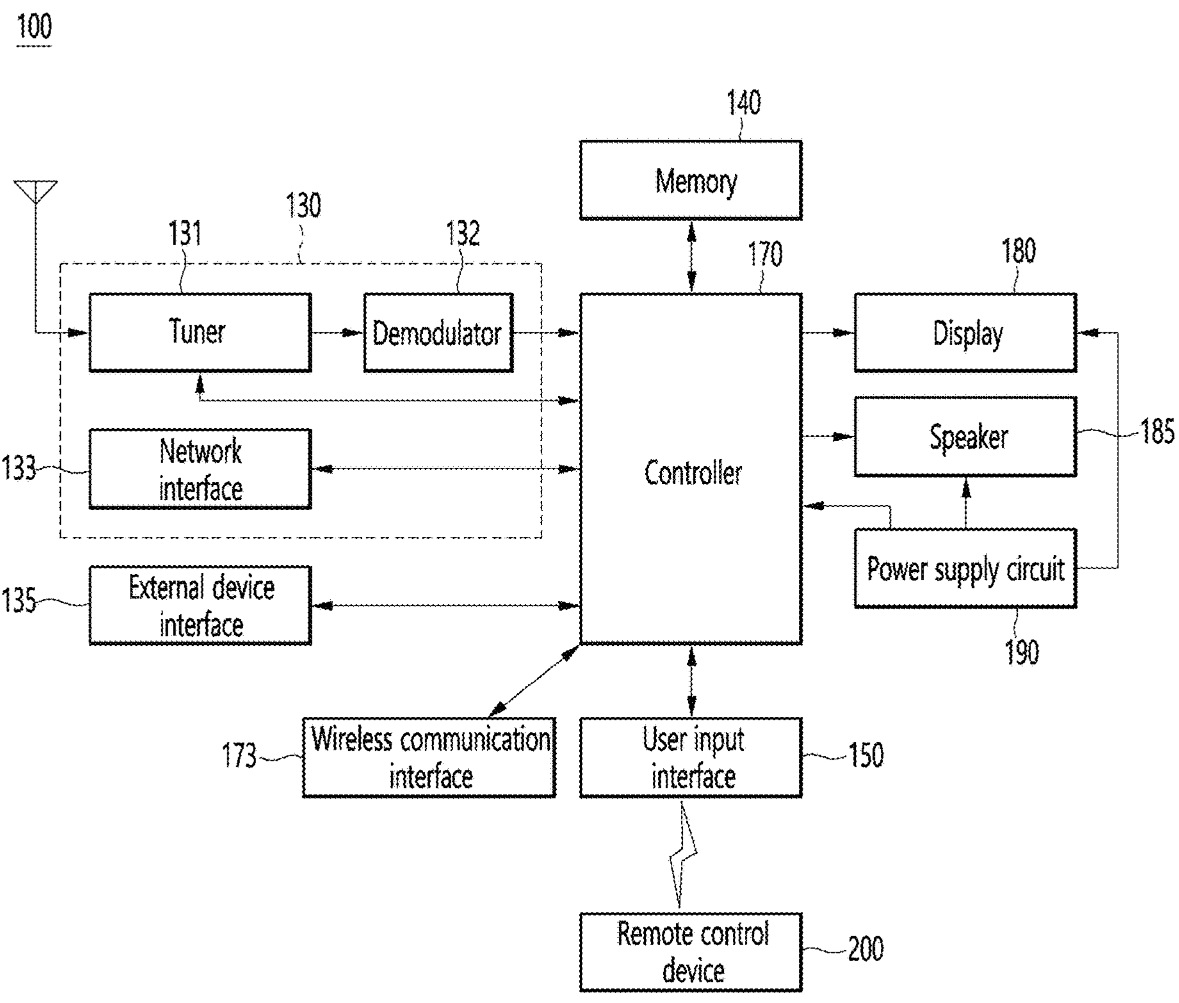
FIG. 1 is a block diagram of a display device according to an embodiment of the present disclosure.

FIG. 1 is a block diagram illustrating the configuration of a display device 100 according to an embodiment of the present disclosure.

Referring to FIG. 1, the display device 100 may include a broadcast receiving unit 130, an external device interface unit 135, a storage unit 140, a user input interface unit 150, a controller 170, a wireless communication unit 173, a voice acquisition unit 175, a display 180, an audio output unit 185, and a power supply unit 190.

The broadcast receiving unit 130 may include a tuner 131, a demodulator 132, and a network interface unit 133.

The tuner 131 may select a specific broadcast channel according to a channel selection command. The tuner 131 may receive a broadcast signal for the selected specific broadcast channel.

The demodulator 132 may separate the received broadcast signal into a video signal, an audio signal, and a data signal related to a broadcast program, and may restore the separated video signal, audio signal, and data signal into a form that can be output.

The network interface unit 133 may provide an interface for connecting the display device 100 to a wired/wireless network including the Internet. The network interface unit 133 may transmit or receive data with another user or another electronic device through the connected network or another network linked to the connected network.

The network interface unit 133 can access a predetermined web page through the connected network or another network linked to the connected network. In other words, it can access a predetermined web page through the network and transmit or receive data with the corresponding server.

In addition, the network interface unit 133 can receive content or data provided by a content provider or a network operator. In other words, the network interface unit 133 can receive content such as movies, advertisements, games, Video on Demand (VOD), broadcast signals, etc., and information related thereto provided from a content provider or a network provider through the network.

In addition, the network interface unit 133 can receive firmware update information and update files provided by the network operator, and can transmit data to the Internet or the content provider or the network operator.

The network interface unit 133 can select and receive a desired application from among applications open to the public through the network.

The external device interface unit 135 can receive an application or an application list in an adjacent external device and transmit it to the controller 170 or the storage unit 140.

The external device interface unit 135 can provide a connection path between the display device 100 and the external device. The external device interface unit 135 can receive one or more of images and audio output from an external device connected wirelessly or wiredly to the display device 100 and transmit it to the controller 170. The external device interface unit 135 can include a plurality of external input terminals. The plurality of external input terminals can include an RGB terminal, one or more High-Definition Multimedia Interface (HDMI) terminals, and a component terminal.

The voice signal of the external device input through the external device interface unit 135 can be output through the display 180. The voice signal of the external device input through the external device interface unit 135 can be output through the audio output unit 185.

The external device connectable to the external device interface unit 135 can be any one of a set-top box, a Blu-ray player, a DVD player, a game console, a sound bar, a smartphone, a PC, a USB memory, and a home theater, but this is only an example.

In addition, some of the content data stored in the display device 100 can be transmitted to another user or another electronic device selected from among other users or electronic devices pre-registered in the display device 100.

The storage unit 140 can store programs for each signal processing and control in the controller 170 and store signal-processed images, voices, or data signals.

In addition, the storage unit 140 may perform a function for temporary storage of video, audio, or data signals input from the external device interface unit 135 or the network interface unit 133, and may store information about a predetermined image through a channel memory function.

The storage unit 140 may store an application or an application list input from the external device interface unit 135 or the network interface unit 133.

The display device 100 may play content files (e.g., video files, still image files, music files, document files, application files, etc.) stored in the storage unit 140 and provide them to the user.

The user input interface unit 150 may transmit a signal input by the user to the controller 170, or transmit a signal from the controller 170 to the user. For example, the user input interface unit 150 may receive and process control signals such as power on/off, channel selection, and screen settings from the remote control device 200 according to various communication methods such as Bluetooth, Ultra Wideband (UWB), ZigBee, Radio Frequency (RF) communication, or IR communication, or may process control signals from the controller 170 to be transmitted to the remote control device 200.

In addition, the user input interface unit 150 may transmit control signals input from local keys (not shown) such as the power key, channel key, volume key, and setting key to the controller 170.

The image signal processed by the controller 170 may be input to the display 180 and displayed as an image corresponding to the image signal. In addition, the image signal processed in the controller 170 can be input to an external output device through the external device interface unit 135.

The audio signal processed in the controller 170 can be output as audio to the audio output unit 185. In addition, the audio signal processed in the controller 170 can be input to an external output device through the external device interface unit 135.

In addition, the controller 170 can control the overall operation within the display device 100.

In addition, the controller 170 can control the display device 100 by a user command or internal program input through the user input interface unit 150, and can connect to a network to allow the user to download a desired application or application list into the display device 100.

The controller 170 allows the channel information, etc. selected by the user to be output through the display 180 or the audio output unit 185 together with the processed video or audio signal.

In addition, the controller 170 allows an image signal or an audio signal from an external device, for example, a camera or a camcorder, input through the external device interface unit 135 to be output through the display 180 or the audio output unit 185 according to an external device image playback command received through the user input interface unit 150.

Meanwhile, the controller 170 can control the display 180 to display an image, and for example, can control a broadcast image input through the tuner 131, an external input image input through the external device interface unit 135, an image input through the network interface unit, or an image stored in the storage unit 140 to be displayed on the display 180. In this case, the image displayed on the display 180 can be a still image or a moving image, and can be a 2D image or a 3D image.

In addition, the controller 170 can control the content stored in the display device 100, or the received broadcast content, or the external input content input from the outside to be played, and the content can be in various forms such as a broadcast image, an external input image, an audio file, a still image, a connected web screen, and a document file.

The wireless communication unit 173 can perform communication with an external device through wired or wireless communication. The wireless communication unit 173 can perform short range communication with the external device. To this end, the wireless communication unit 173 can support short range communication by using at least one of Bluetooth™, Bluetooth Low Energy (BLE), Radio Frequency Identification (RFID), Infrared Data Association (IrDA), UWB, ZigBee, Near Field Communication (NFC), Wireless-Fidelity (Wi-Fi), Wi-Fi Direct, and Wireless Universal Serial Bus (Wireless USB) technologies. The wireless communication unit 173 can support wireless communication between the display device 100 and the wireless communication system, between the display device 100 and another display device 100, or between the display device and the network where the display device (100, or external server) is located through a short-range wireless communication network (e.g., Wireless Area Networks). The short-range wireless communication network can be a short-range wireless personal area network (e.g., Wireless Personal Area Networks).

Here, the other display device 100 may be a wearable device (e.g., a smart watch, smart glasses, a head-mounted display (HMD), a mobile terminal such as a smart phone) that can exchange data with the display device 100 according to the present disclosure (or can be linked). The wireless communication unit 173 may detect (or recognize) a wearable device capable of communication around the display device 100. Furthermore, if the detected wearable device is an authenticated device to communicate with the display device 100 according to the present disclosure, the controller 170 may transmit at least a part of the data processed in the display device 100 to the wearable device through the wireless communication unit 173. Therefore, a user of the wearable device may use the data processed in the display device 100 through the wearable device.

The voice acquisition unit 175 can acquire audio. The voice acquisition unit 175 can include at least one microphone (not shown) and can acquire audio around the display device 100 through the microphone (not shown).

The display 180 can convert the image signal, data signal, OSD signal processed by the controller 170 or the image signal, data signal, etc. received from the external device interface unit 135 into R, G, B signals, respectively, to generate a driving signal.

Meanwhile, the display device 100 illustrated in FIG. 1 is only an embodiment of the present disclosure. Some of the illustrated components may be integrated, added, or omitted according to the specifications of the display device 100 actually implemented.

That is, two or more components may be combined into one component, or one component may be subdivided into two or more components, as needed. In addition, each of the functions performed in the block are intended to illustrate embodiments of the present disclosure, and the specific operations or devices thereof do not limit the scope of the present disclosure.

According to another embodiment of the present disclosure, the display device 100 may receive and play back images through the network interface unit 133 or the external device interface unit 135 without having a tuner 131 and a demodulator 132 as shown in FIG. 1.

For example, the display device 100 may be implemented separately as an image processing device, such as a set-top box, for receiving contents according to broadcast signals or various network services, and a content playback device for playing back content input from the image processing device.

In this case, the operation method of the display device according to the embodiment of the present disclosure described below may be performed by any one of the image processing device, such as a separate set-top box, or a content playback device having a display 180 and an audio output unit 185, as well as the display device 100 described with reference to FIG. 1.

The audio output unit 185 receives a signal processed by the controller 170 and outputs it as voice.

The power supply unit 190 supplies the corresponding power to the entire display device 100. In particular, power can be supplied to the controller 170 that can be implemented in the form of a system on chip (SOC), the display 180 for displaying images, the audio output unit 185 for audio output, etc.

Specifically, the power supply unit 190 can be equipped with a converter that converts AC power into DC power, and a dc/dc converter that converts the level of the DC power.

Next, a remote control device according to an embodiment of the present disclosure will be described with reference to FIGS. 2 and 3.

Figure 2:
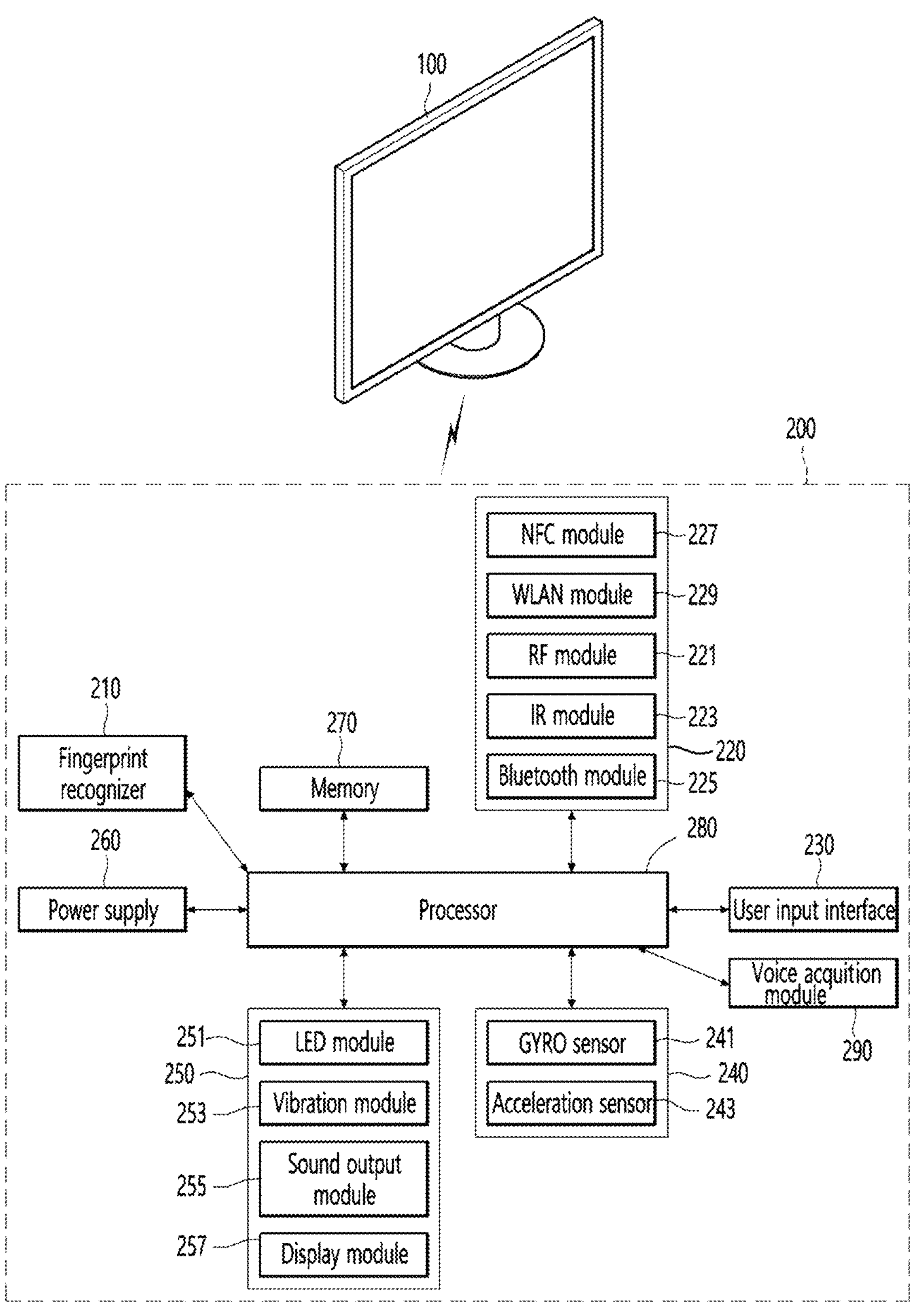
FIG. 2 is a block diagram of a remote control device according to an embodiment of the present disclosure.
Figure 3:
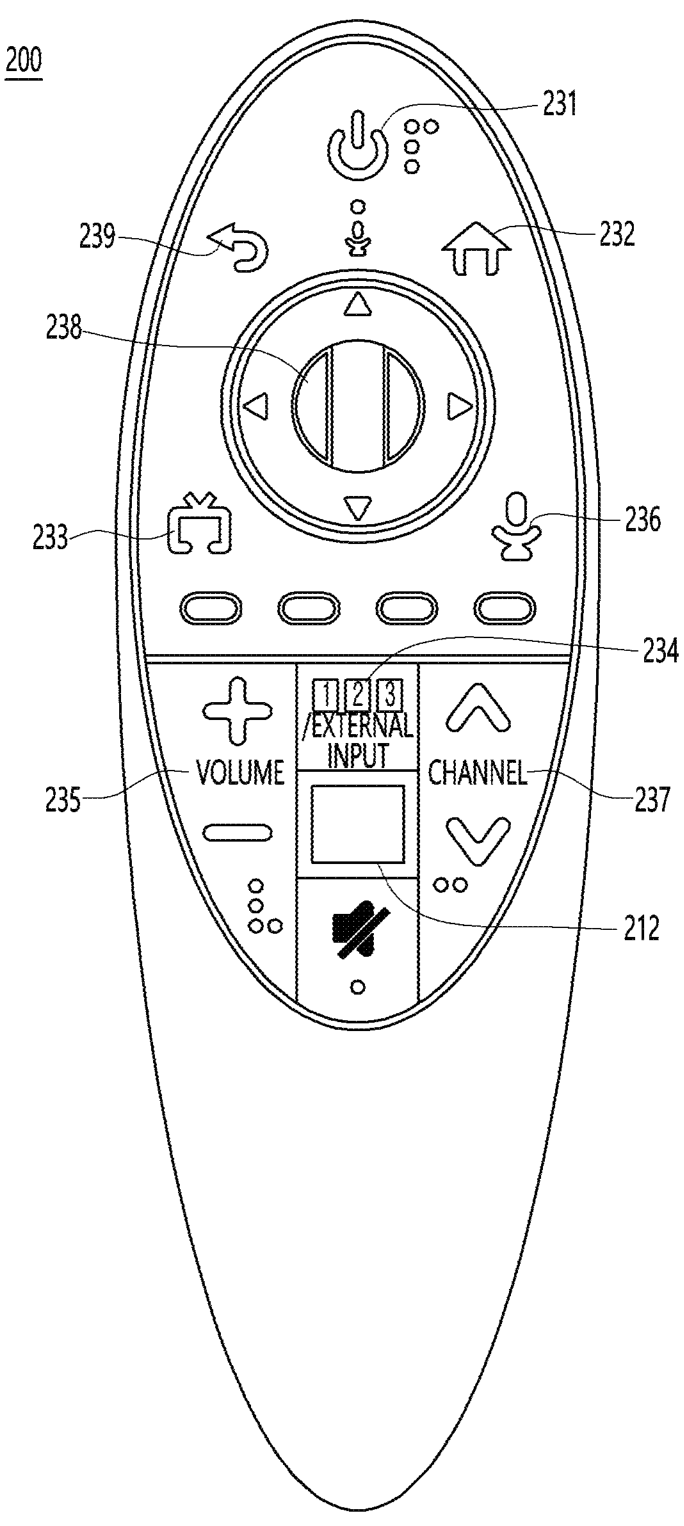
FIG. 3 is an example of an actual configuration of a remote control device according to an embodiment of the present disclosure.

FIG. 2 is a block diagram of a remote control device according to an embodiment of the present disclosure, and FIG. 3 illustrates an example of an actual configuration of a remote control device according to an embodiment of the present disclosure.

First, referring to FIG. 2, the remote control device 200 may include a fingerprint recognition unit 210, a wireless communication unit 220, a user input unit 230, a sensor unit 240, an output unit 250, a power supply unit 260, a storage unit 270, a controller 280, and a voice acquisition unit 290.

Referring to FIG. 2, the wireless communication unit 220 transmits and receives signals with any one of the display devices according to the embodiments of the present disclosure described above.

The remote control device 200 may be equipped with an RF module 221 capable of transmitting and receiving signals with the display device 100 according to RF communication standards, and may be equipped with an IR module 223 capable of transmitting and receiving signals with the display device 100 according to IR communication standards. In addition, the remote control device 200 may be equipped with a Bluetooth module (225) capable of transmitting and receiving signals with the display device 100 according to Bluetooth communication standards. In addition, the remote control device 200 may be equipped with an NFC module 227 capable of transmitting and receiving signals with the display device 100 according to NFC communication standards, and may be equipped with a Wireless LAN (WLAN) module 229 capable of transmitting and receiving signals with the display device 100 according to WLAN communication standards.

In addition, the remote control device 200 transmits a signal containing information about the movement of the remote control device 200 to the display device 100 through the wireless communication unit 220.

Meanwhile, the remote control device 200 can receive a signal transmitted by the display device 100 through the RF module 221, and, if necessary, can transmit commands for power on/off, channel change, volume change, etc. to the display device 100 through the IR module 223.

The user input unit 230 can be composed of a keypad, a button, a touch pad, or a touch screen. The user can input a command related to the display device 100 to the remote control device 200 by operating the user input unit 230. If the user input unit 230 is equipped with a hard key button, the user can input a command related to the display device 100 to the remote control device 200 through a push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, a confirmation button 238, and a back button 239.

The fingerprint recognition button 212 may be a button for recognizing a user's fingerprint. In one embodiment, the fingerprint recognition button 212 may be capable of a push operation, and may receive a push operation and a fingerprint recognition operation. The power button 231 may be a button for turning the display device 100 on/off. The home button 232 may be a button for moving to the home screen of the display device 100. The live button 233 may be a button for displaying a real-time broadcast program. The external input button 234 may be a button for receiving an external input connected to the display device 100. The volume control button 235 may be a button for adjusting the size of the volume output by the display device 100. The voice recognition button 236 may be a button for receiving a user's voice and recognizing the received voice. The channel change button 237 may be a button for receiving a broadcast signal of a specific broadcast channel. The confirmation button 238 may be a button for selecting a specific function, and the back button 239 may be a button for returning to the previous screen.

FIG. 2 will be described again.

If the user input unit 230 is equipped with a touch screen, the user can input a command related to the display device 100 to the remote control device 200 by touching the soft key of the touch screen. In addition, the user input unit 230 may be equipped with various types of input devices that the user can operate, such as a scroll key or a jog key, and this embodiment does not limit the scope of the rights of the present disclosure.

The sensor unit 240 may be equipped with a gyro sensor 241 or an acceleration sensor 243, and the gyro sensor 241 may sense information about the movement of the remote control device 200.

For example, the gyro sensor 241 can sense information about the operation of the remote control device 200 based on the x, y, and z axes, and the acceleration sensor 243 can sense information about the movement speed of the remote control device 200. Meanwhile, the remote control device 200 can further be equipped with a distance measuring sensor, and can sense the distance to the display 180 of the display device 100.

The output unit 250 can output a video or audio signal corresponding to the operation of the user input unit 230 or the signal transmitted from the display device 100. Through the output unit 250, the user can recognize whether the user input unit 230 is being operated or whether the display device 100 is being controlled.

For example, the output unit 250 can be equipped with a light emitting device (LED) module 251 that lights up when the user input unit 230 is operated or a signal is transmitted and received with the display device 100 through the wireless communication unit 220, a vibration module 253 that generates vibration, an audio output module 255 that outputs sound, or a display module 257 that outputs an image.

In addition, the power supply unit 260 supplies power to the remote control device 200, and power waste can be reduced by stopping the power supply when the remote control device 200 does not move for a predetermined period of time. The power supply unit 260 can resume the power supply when a predetermined key provided in the remote control device 200 is operated.

The storage unit 270 can store various types of programs, application data, etc. required for the control or operation of the remote control device 200. If the remote control device 200 wirelessly transmits and receives signals through the display device 100 and the RF module 221, the remote control device 200 and the display device 100 transmit and receive signals through a predetermined frequency band.

The controller 280 of the remote control device 200 can store and refer to information about the frequency band, etc., that can wirelessly transmit and receive signals with the display device 100 paired with the remote control device 200, in the storage unit 270.

The controller 280 controls all matters related to the control of the remote control device 200. The controller 280 can transmit a signal corresponding to a predetermined key operation of the user input unit 230 or a signal corresponding to the movement of the remote control device 200 sensed by the sensor unit 240 to the display device 100 through the wireless communication unit 220.

In addition, the voice acquisition unit 290 of the remote control device 200 can acquire voice.

The voice acquisition unit 290 may include at least one microphone 291, and may acquire voice through the microphone 291.

Next, FIG. 4 will be described.

Figure 4:
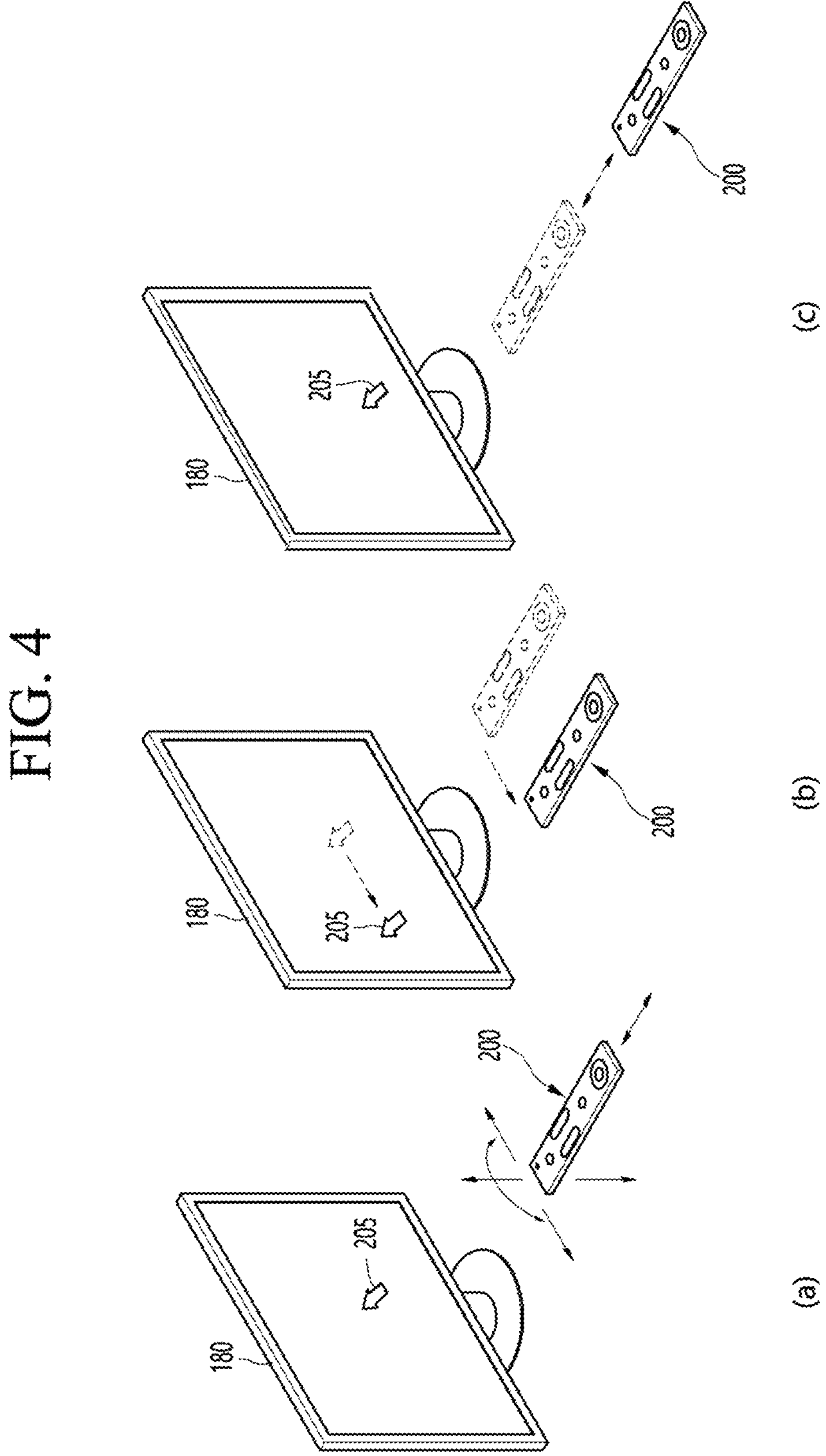
FIG. 4 is an example of utilizing a remote control device according to an embodiment of the present disclosure.

FIG. 4 illustrates an example of utilizing a remote control device according to an embodiment of the present disclosure.

FIG. 4(*a*) exemplifies that a pointer 205 corresponding to a remote control device 200 is displayed on a display 180.

The user may move or rotate the remote control device 200 up and down, left and right. The pointer 205 displayed on the display 180 of the display device 100 corresponds to the movement of the remote control device 200. This remote control device 200 can be called a space remote control because, as shown in the drawing, the pointer 205 moves and is displayed according to the movement in the 3D space.

FIG. 4(*b*) illustrates an example in which, when the user moves the remote control device 200 to the left, the pointer 205 displayed on the display 180 of the display device 100 also moves to the left in response.

Information about the movement of the remote control device 200 detected through the sensor of the remote control device 200 is transmitted to the display device 100. The display device 100 can calculate the coordinates of the pointer 205 from the information about the movement of the remote control device 200. The display device 100 can display the pointer 205 to correspond to the calculated coordinates.

FIG. 4(*c*) illustrates a case where a user moves the remote control device 200 away from the display 180 while pressing a specific button in the remote control device 200. As a result, the selection area in the display 180 corresponding to the pointer 205 can be zoomed in and displayed in an enlarged manner.

Conversely, when the user moves the remote control device 200 closer to the display 180, the selection area in the display 180 corresponding to the pointer 205 can be zoomed out and displayed in a reduced manner.

Meanwhile, when the remote control device 200 moves away from the display 180, the selection area can be zoomed out, and when the remote control device 200 moves closer to the display 180, the selection area can be zoomed in.

In addition, when a specific button in the remote control device 200 is pressed, recognition of up/down and left/right movement can be excluded. That is, when the remote control device 200 moves away from or toward the display 180, up/down, left/right movement is not recognized, and only forward/backward movement can be recognized. When a specific button in the remote control device 200 is not pressed, only the pointer 205 moves according to the up/down, left/right movement of the remote control device 200.

Meanwhile, the movement speed or movement direction of the pointer 205 can correspond to the movement speed or movement direction of the remote control device 200.

Meanwhile, the pointer in this specification means an object displayed on the display 180 in response to the operation of the remote control device 200. Therefore, objects of various shapes other than the arrow shape illustrated in the drawing are possible as the pointer 205. For example, it may be a concept including a point, a cursor, a prompt, a thick outline, etc. And the pointer 205 may be displayed corresponding to one point of the horizontal and vertical axes on the display 180, and may also be displayed corresponding to multiple points such as a line or a surface.

Figure 5:
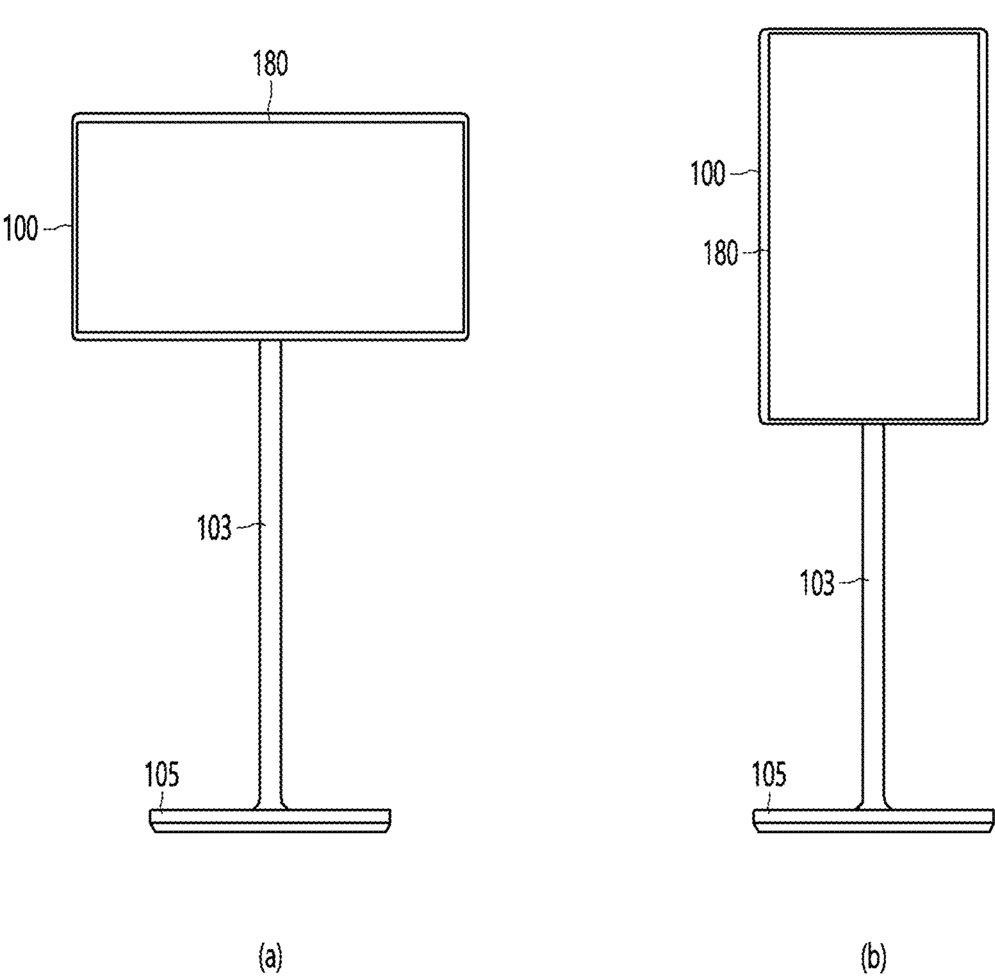
FIG. 5 is a drawing for explaining the horizontal mode and vertical mode of a stand-type display device according to an embodiment of the present disclosure.

FIG. 5(*a*) and FIG. 5(*b*) are drawings for explaining the horizontal mode and the vertical mode of the stand-type display device according to the embodiment of the present disclosure.

Referring to FIG. 5(*a*) and FIG. 5(*b*), a stand-type display device 100 is illustrated.

A shaft 103 and a stand base 105 may be connected to the display device 100.

The shaft 103 may connect the display device 100 and the stand base 105. The shaft 103 may be extended vertically.

The lower end of the shaft 103 can be connected to the edge of the stand base 105.

The lower end of the shaft 103 can be rotatably connected to the periphery of the stand base 105.

The display device 100 and the shaft 103 can rotate around a vertical axis with respect to the stand base 105.

The upper end of the shaft 103 can be connected to the rear of the display device 100.

The stand base 105 can serve to support the display device 100.

The display device 100 can be configured to include the shaft 103 and the stand base 105.

The display device 100 can rotate around the point where the upper part of the shaft 103 and the rear part of the display 180 meet.

FIG. 5(*a*) illustrates that the display 180 operates in a landscape mode in which the horizontal length is greater than the vertical length, and FIG. 5(*b*) illustrates that the display 180 operates in a landscape mode in which the vertical length is greater than the horizontal length.

The user can move the stand-type display device 100. That is, unlike a fixed device, the stand-type display device 100 has improved mobility, so the user is not restricted by the placement location.

The following is an object of the present disclosure to provide a display system including a pressure sensor which is capable of more accurate sensing of pressure by minimizing a noise, a smart pad including the pressure sensor, and a display device 100 that communicates with and processes the smart pad.

Figure 6:
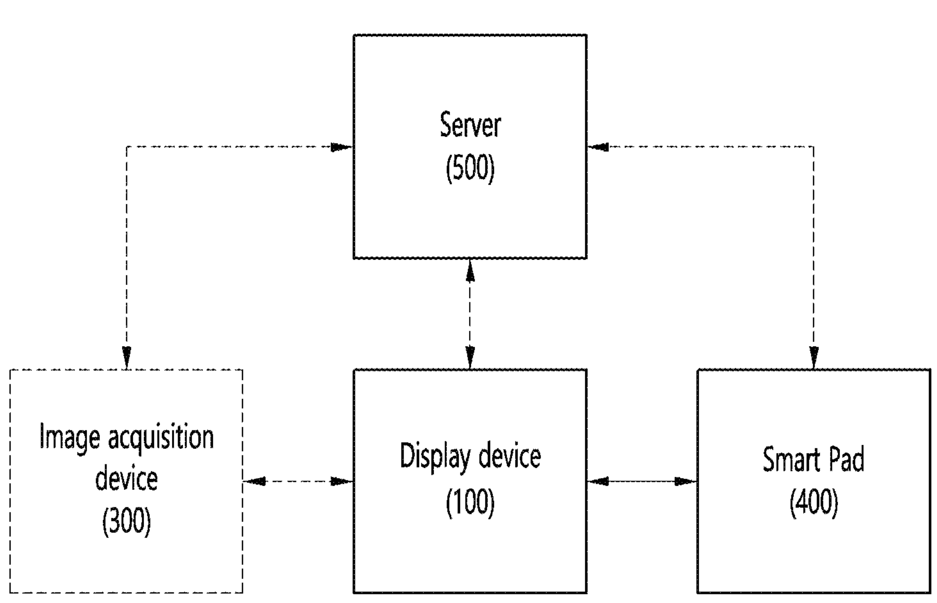
FIG. 6 is a schematic diagram of a display system according to an embodiment of the present disclosure.

FIG. 6 is a schematic diagram of a display system according to an embodiment of the present disclosure.

FIG. 7 is a drawing illustrating types of pressure sensors.

Conventional display devices were devices that simply output broadcast programs by receiving broadcast signals, but with the development of digital technology and Over The Top (OTT), it has become common for display devices that provide relatively large screens to enjoy content through connection with various external devices. For example, a user can enjoy content of a display device while exercising on a smart pad described below.

Referring to FIG. 6, a display system according to at least one of various embodiments of the present disclosure may include a smart pad 400 and the display device 100 including the display 180 that processes and outputs a signal acquired from the smart pad 400.

At this time, the display system may be configured to further include at least one of an image acquisition device 300 and a server 500 depending on the embodiment. However, the image acquisition device 300 and the server 500 may not be essential components.

The server 500 can replace all or part of the operation or processing of the display device 100.

The server 500 can obtain the user's pressure signal (or/and movement signal according to such pressure) from the smart pad 400. The server 500 can transmit the user's pressure signal thus obtained to the display device 100.

In the above transmission process, the user's pressure signal can be transmitted as raw data to the display device 100. Alternatively, the user's pressure signal can be transmitted to the display device 100 after being preprocessed by the server 500.

In the above processing process, the server 500 can process the obtained user's pressure signal, analyze the processed signal, and transmit the analysis result or/and additional information (e.g., motion control information, etc.) according to the analysis to the display device 100. In the latter case, the server 500 can control the operation of the display device 100 by transmitting a control command generated based on the above-described analysis result to the display device 100.

For convenience of explanation, the following description will focus on the display device 100 and the smart pad 400.

Here, the display device 100 can provide content through the screen.

At this time, the content can include an application, and such an application can include an intelligent fit application that provides various functions such as health-related posture measurement and diagnosis.

In one embodiment, the display device 100 can be in a state where, for example, the intelligent fit application is running in the foreground or background, but is not limited thereto.

As described above, when the intelligent fit application is running in a foreground or background, the display device 100 can be paired or/and connected with the smart pad 400, and can obtain signals containing various information therefrom.

At least some of the various pieces of information generated or output by the display device 100 or/and the server 500 can be transmitted to a terminal (not shown) held by the user and provided so that the user can use them. In this case, it is preferable that the terminal also has the intelligent fit application installed, but is not limited thereto.

From the above-mentioned viewpoint, the terminal can also be included as a component of the display system.

Meanwhile, each component constituting the system is preferably a device that has been pre-registered with another component or at least belongs to the same network and can be connected by a wired/wireless communication protocol.

In FIG. 6, one smart pad 400 is illustrated for convenience, but multiple smart pads may be connected to one display device 100 at the same time to form a display system. At this time, the configuration, performance, version, etc. of each smart pad 400 may or may not be the same.

The smart pad 400 may sense a pressure signal generated by a user's contact.

The smart pad 400 may include a pressure sensor to sense the pressure signal.

Referring to FIG. 7, the pressure sensor may include a resistive pressure sensor and a capacitive pressure sensor, but is not limited thereto.

Looking at the structure of the resistive pressure sensor, conductive ink may be formed between Polyethylene Polypropylene (PEP) films, and silver ink may be formed at the bottom of the conductive ink. Meanwhile, spacers may be formed on both sides of the lower end of the above-mentioned challenging ink.

However, in the case of a resistive pressure sensor, as shown in the graph of FIG. 7, the resistance generated by pressure is dependent on the thickness (e.g., $R \propto d$), but the thickness of the pressure sensor is thin (e.g., usually less than 1 mm) and there is a nonlinear pressure section, so it is not easy to accurately sense and derive meaningful data from it.

Referring to FIG. 7, the structure of the capacitive pressure sensor can sense the pressure by obtaining the change in capacitance according to the pressure by using a dielectric material such as foam between the electrode that directly receives the pressure and the signal electrode that senses the signal according to the pressure.

Referring to the graph of FIG. 7, the capacitance can be calculated by the value obtained by dividing the product of the dielectric constant ($\varepsilon$) of the dielectric material and the area (A) between the electrodes by the spacing (d) between the electrodes ($C=\varepsilon A/d$). This capacitance (C) can depend on, for example, a three-dimensional deformation (i.e., volume) due to pressure.

However, this capacitance pressure sensor has the advantage of being relatively high in sensing accuracy according to pressure since the entire pressure range is linear compared to a resistive pressure sensor, and high-resolution imaging (matrix) is possible.

The pressure sensor of the capacitance structure illustrated in FIG. 7 may include electrodes formed on the upper and lower sides respectively based on the dielectric layer.

In FIG. 7, when the pressure is applied in a direction from top to bottom as illustrated, the upper electrode may be formed as a ground electrode and the lower electrode as a signal electrode.

In the case of the pressure sensor of the capacitance structure of FIG. 7, noise that matches the direction of pressure, i.e., noise approaching from above, can be shielded. However, the pressure sensor of the capacitive structure of FIG. 7 can also sense signals approaching from the side of the pressure sensor (i.e., in a direction that does not match the pressing direction) or noise signals formed from the bottom surface (e.g., in a direction opposite to the pressing direction). Therefore, it may not be easy to separate and obtain only a pure pressure signal from the signal sensed by the pressure sensor.

In the present disclosure, as an example, a pressure sensor adopts a capacitive pressure sensor instead of a resistive pressure sensor, and discloses a pressure sensor/smart pad 400 of a new structure that improves the pressure sensor of the capacitive structure illustrated in FIG. 7.

Hereinafter, embodiments of the pressure sensor according to the present disclosure or the smart pad 400 including the pressure sensor will be described in more detail with reference to the attached drawings. Even if it is described simply as a pressure sensor hereinafter, it may also indicate a smart pad 400 depending on the context.

Figure 8:
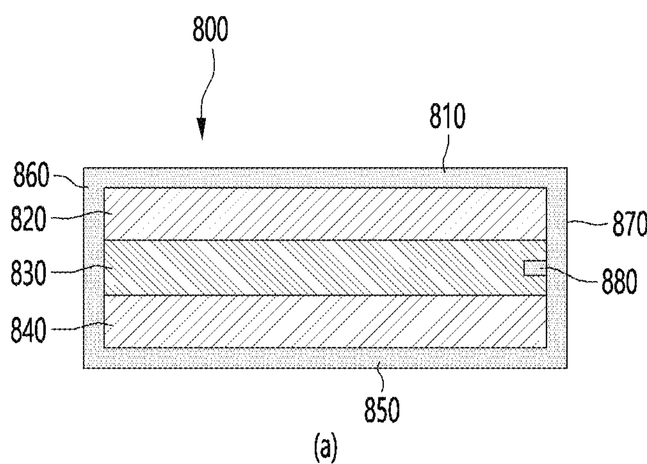
FIGS. 8 to 9 are drawings for explaining the structure of a pressure sensor included in a smart pad according to an embodiment of the present disclosure.
Figure 8:
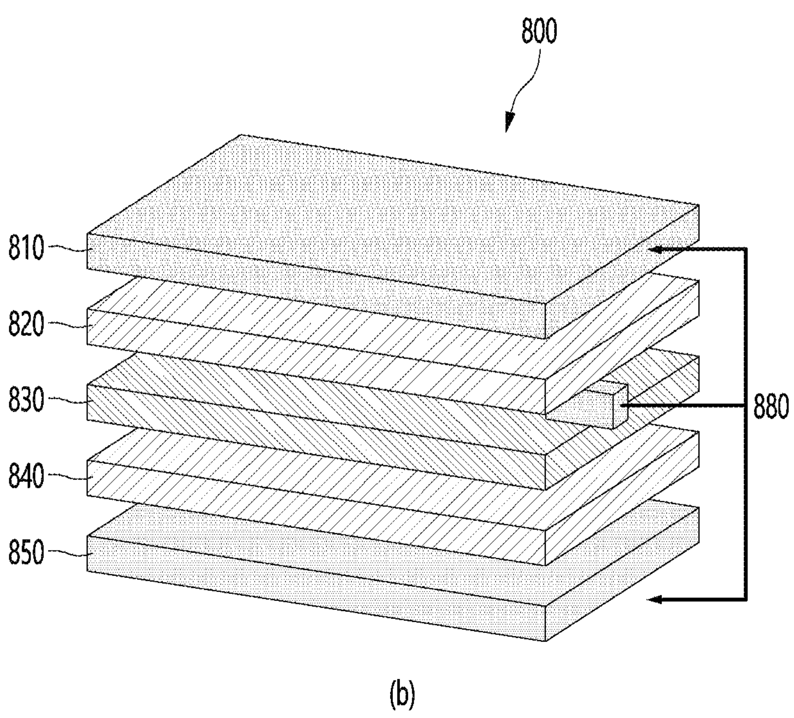
Figure 9:
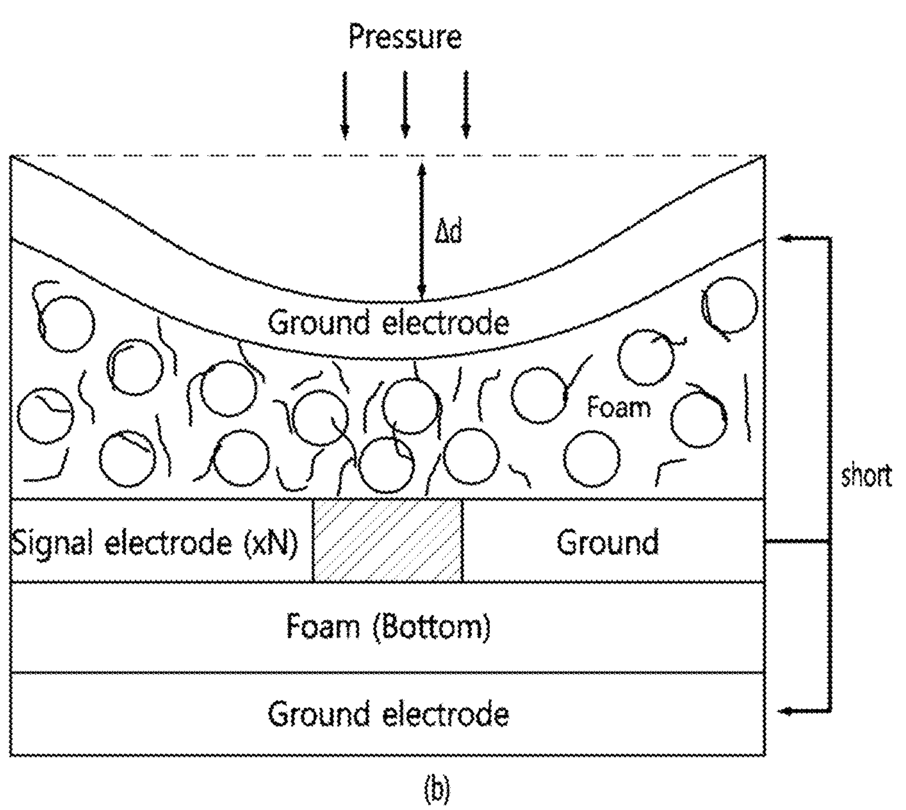

FIGS. 8 to 9 are drawings illustrating the structure of a pressure sensor included in a smart pad 400 according to an embodiment of the present disclosure.

Figure 10:
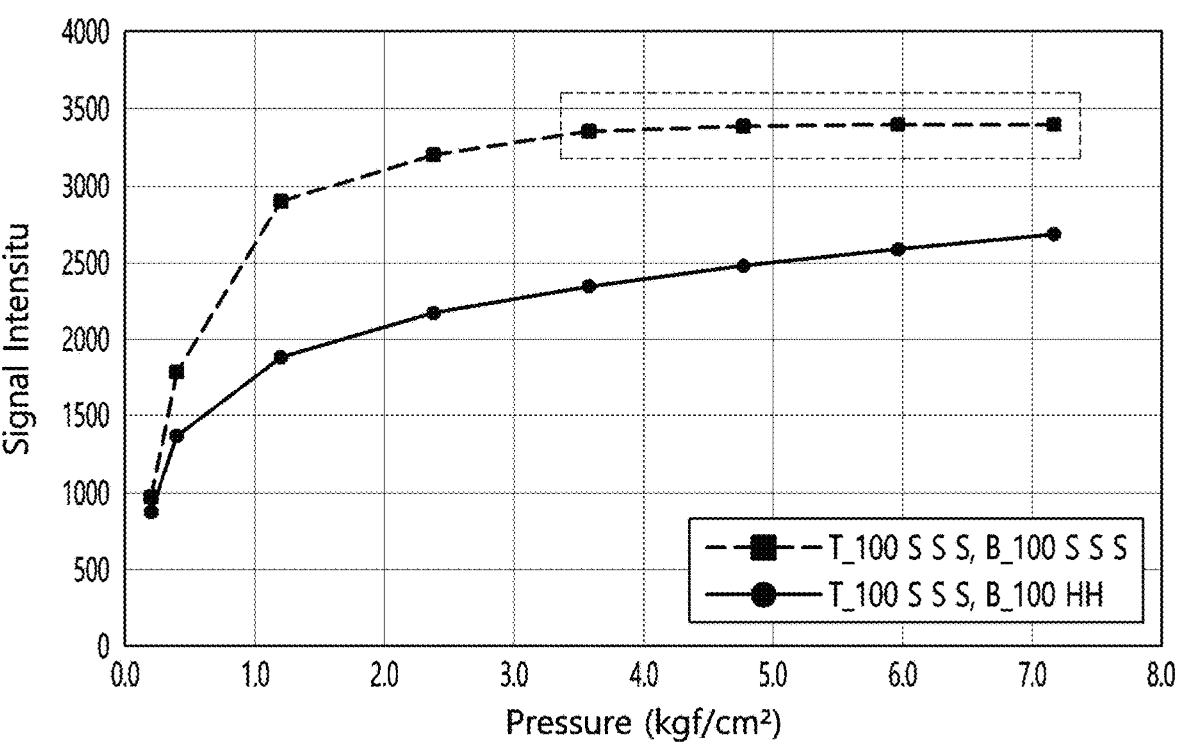
FIG. 10 is a graph for explaining the characteristics of a pressure sensor according to an embodiment of the present disclosure.

FIG. 10 is a graph illustrating the characteristics of a pressure sensor according to an embodiment of the present disclosure.

Figure 11:
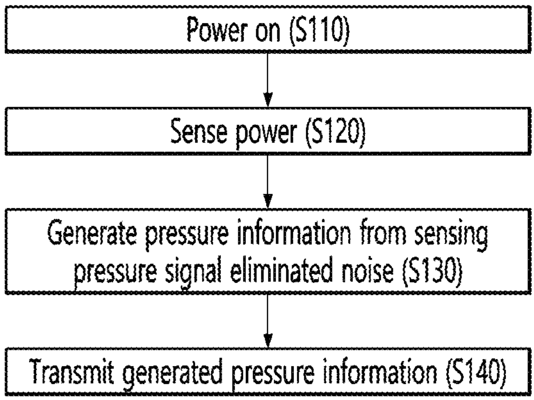
FIG. 11 is a drawing for explaining an operating method in a display system according to an embodiment of the present disclosure.

FIG. 11 is a drawing illustrating an operating method in a display system according to an embodiment of the present disclosure.

A pressure sensor 800 included in a smart pad 400 according to an embodiment of the present disclosure may be configured to include, for example, a plurality of electrodes. Here, the plurality of electrodes may refer to a number greater than the two electrodes of FIG. 7 described above.

FIG. 8(*a*) is a cross-sectional view of a pressure sensor 800, and FIG. 8(*b*) is a perspective view of a pressure sensor 800.

Referring to FIG. 8(*a*), the plurality of electrodes included in the pressure sensor 800 according to the present disclosure may include, for example, a first electrode 810, a second electrode 850 formed at a position corresponding to the first electrode 810, and a third electrode 830 formed between the first electrode 810 and the second electrode 850.

In addition, the plurality of electrodes included in the pressure sensor 800 according to the present disclosure may further include a fourth electrode 880 formed at one end of the third electrode 830.

The plurality of electrodes included in the pressure sensor 800 may further include a fifth electrode 860 and 870 that connects one end of the first electrode 810 and one end of the second electrode 850 to each other.

A first dielectric 820 may be included in between the first electrode 810 and the third electrode 830. In addition, a second dielectric 840 may be included in between the third electrode 830 and the second electrode 850.

In the above, the third electrode 830 may be a multi-channel signal electrode, but is not limited thereto.

In the above, the fourth electrode 880 may be a ground electrode.

And, the fifth electrode 860 and 870 may each be in contact with the fourth electrode 880 according to the pressure direction.

At least one of the first electrode 810, the second electrode 850, and the fifth electrode 860 and 870 may be formed using an adhesive tape.

At least one of the first electrode 810, the second electrode 850, and the fifth electrode 860 and 870 may be connected to the fourth electrode 880 on a Flexible Printed Circuit Board (FPCB).

Since the fifth electrode 860 and 870 is connected to the fourth electrode 880, i.e., the ground, according to the pressure direction, a noise unrelated to the pressure direction, for example, a signal formed from the side or bottom, may be input to the ground and thus may be eliminated or minimized.

Meanwhile, if the first electrode 810, the second electrode 850, and the fifth electrode 860 and 870 are formed through conductive fabric, they may be integrated electrodes rather than individual electrodes. In this case, the smart pad 400 may be configured to include the pressure sensor of FIG. 8 and other areas where the pressure sensor is not included.

Alternatively, the smart pad 400 may be formed on the first electrode 810 and the second electrode 850.

The first electrode 810 may be formed of an electrode or conductive fabric, and may be a surface that directly contacts the subject of pressure or a surface to which pressure is initially applied. The first electrode 810 may block a noise that may be input from an outside and may serve as an electrode in a capacitive structure. This first electrode 810 may be a ground electrode.

In this present disclosure, for the convenience of explanation, the first electrode 810, the second electrode 850, and the fifth electrode 860, 870 are described as electrodes that are distinguished according to their positions, but as described above, they can be implemented as an integrated body, and for this purpose, a conductive fabric is used, and the conductive fabric can be in the form of an electrode that entirely wraps the elastic dielectrics 820, 840 and the third electrode 830.

In the above, even if the conductive fabric is an electrode that entirely wraps the elastic dielectrics 820, 840 and the third electrode 830 or is in the form of an individual electrode, they can each be a ground electrode or connected to each other through the fourth electrode 880 to prevent a noise from being introduced to the third electrode 830 described below.

The third electrode 830 may be a signal electrode and can be a multi-channel signal electrode.

In addition, a fourth electrode 880 may be formed at one end of the third electrode 830.

In this case, as described above, the arrangement relationship between the third electrode 830 and the fourth electrode 880 may be configured in various ways.

For example, referring to FIG. 8(*b*), the fourth electrode 880 may be formed between one side of the third electrode 830 and the first elastic dielectric 820.

Alternatively, depending on the embodiment, the fourth electrode 880 may be formed between one side of the third electrode 830 and the second elastic dielectric 840.

In addition, depending on the embodiment, the fourth electrode 880 may be arranged in parallel with the third electrode 830 as shown in FIG. 9(*b*) described below.

Or, according to the embodiment, it may be configured to be connected to a ground (not shown) formed separately through a conductor from one side of the elastic dielectrics 820, 840 or the third electrode 830.

Referring to FIG. 9(*b*), according to one embodiment, a sensing channel may be formed on the third electrode 830 or between the third electrode 830 and the ground, i.e., the fourth electrode 880.

According to one embodiment of the present disclosure, a plurality of sensing channels may be formed on the third electrode 830. The sensing channels may be formed at predetermined intervals so that there is no problem with the expected pressurization position or signal sensing according to the pressurization.

Referring to FIG. 9(*b*), the sensing channel may be formed at a position corresponding to a position where the distance value changes the most in the first elastic dielectric 820 when pressurized. However, it is not limited thereto.

The first elastic dielectric 820 is a layer formed of a dielectric material such as foam, and may be formed to have a predetermined distance between the first electrode 810 and the third electrode 830 (or FPCB electrode), that is, may be formed with a predetermined thickness or volume.

The first elastic dielectric 820 may also function as a type of spacer.

When the first elastic dielectric 820 is pressed, a change in distance may occur between the first electrode 810 and the third electrode 830 according to a physical change in the foam.

In this way, a change in distance between the first electrode 810 and the third electrode 830 due to a physical change in the first elastic dielectric 820 may ultimately cause a change in capacitance (C).

When the distance between the first electrode 810 and the third electrode 830 decreases, the capacitance (C) increases.

The quantitative analysis principle according to the change in capacitance based on this distance change can be ultimately replaced with a pressure signal.

As described above, the pressure signal produced in this way is a pressure signal due to pure pressurization or close to it because noise is removed from the first electrode 810 by insulation, i.e., ground.

Meanwhile, the second elastic dielectric 840 can also be composed of a dielectric material such as foam, and can form a distance between the second electrode 850 and the third electrode 830 and maintain the formed distance.

In other words, the second elastic dielectric 840 can be configured so that a physical change occurs only when the pressure is greater than the critical pressure. Here, the critical pressure can be set. For example, the critical pressure may be set to about 3 kgf/cm$^2$ or more. However, the present disclosure is not limited to the above value.

The first elastic dielectric 820 and the second elastic dielectric 840 may be formed of the same material, or they may not be.

The thicknesses of the first elastic dielectric 820 and the second elastic dielectric 840 may be the same or different.

The elasticity or physical change rate of the first elastic dielectric 820 and the second elastic dielectric 840 may be the same or different.

According to an embodiment, the first elastic dielectric 820 formed between the third electrode 830 and the first electrode 810 may be formed of multiple layers.

According to an embodiment, the second elastic dielectric 840 formed between the third electrode 830 and the second electrode 850 may be formed of multiple layers.

According to an embodiment, both the first elastic dielectric 820 and the second elastic dielectric 840 may be formed of multiple layers.

In the above, when formed of multiple layers, the materials of each layer may or may not be the same.

The first elastic dielectric 820 may not form one layer as a whole, but may form one layer with multiple separate sections.

The second elastic dielectric 840 may not form one layer as a whole, but may form one layer with multiple separate sections.

The third electrode 830 may form one layer with one electrode, but may also be separated so that multiple third electrodes form one electrode layer.

FIG. 9(*a*) illustrates the basic structure of a capacitor, and FIG. 9(*b*) illustrates the structure according to the present disclosure.

Referring to FIG. 9(*a*), a dielectric is placed between the electrodes, and in this case, the capacitance is determined by the product of the dielectric constant and the area (A) divided by the distance (d) (($C=\varepsilon*(A/d)$)).

On the other hand, referring to FIG. 9(*b*), the structure of the third electrode 830 may include a signal electrode (xN) placed in the first region and a ground electrode placed in the second region.

At this time, a region where a separate insulating material is applied may be formed between the first region and the second region. The region may allow the first region and the second region to be electrically separated.

Referring to FIG. 9(*b*), the first electrode layer 810 and the first elastic dielectric 820, which were flat before pressing, are pressed by a distance (Δd) in the pressing direction. moves.

Referring to FIG. 9(*b*), the distance (Δd) that the first electrode layer 810 and the first elastic dielectric 820 move in the pressing direction may be different depending on the pressing intensity.

In this case, the distance value adopted by the sensing channel may be different depending on the position of the sensing channel.

Alternatively, the value with the largest distance change value (Δd) may be adopted regardless of the position of the sensing channel.

As described above, this distance change value (Δd) ultimately brings about a change in capacitance between the signal electrodes (xN), and a pressure signal can be generated or extracted based on such a change in capacitance.

FIG. 10 is a graph illustrated to explain the characteristics of the pressure sensor 800, particularly the first elastic dielectric 820 and the second elastic dielectric 840 in relation to the present disclosure.

In the present disclosure The elastic dielectric may be a polyurethane foam type. However, the present disclosure is not limited thereto.

In the present disclosure, the first elastic dielectric 820 is preferably formed as a soft type so as to reflect the distance change according to pressure well.

As such a soft type elastic dielectric, for example, Glass Mat Composite with Sheet molding compound (GMC-S), which has low density and low elastic modulus, excellent softness and sealing properties, low strain, and is advantageous in shock absorption, can be exemplified. However, this is only an example, and the present disclosure is not limited thereto.

In the present disclosure, the second elastic dielectric 840 can be formed as a hard type.

As such a hard type elastic dielectric, for example, Glass Mat Composite-Heavy Duty High Heat (GMC-HH), which is excellent in physical strength and vibration absorption properties and has excellent elastic restoring power, can be exemplified. However, this is only an example, and the present disclosure is not limited thereto.

With regard to selecting a material sensitivity range of the elastic dielectric, it is preferable to select a soft type material, for example, less than 0.2 g/cm$^3$, for the first elastic dielectric 820. And it is preferable to select a hard type material, for example, greater than 0.4 g/cm$^3$, for the second elastic dielectric 840. However, the present disclosure is not limited to the above-mentioned values.

The thickness of the first elastic dielectric 820 and the second elastic dielectric 840 may or may not be the same. However, the thickness may be about 50 μm, but this is only an example and is not limited thereto.

Referring to the graph of FIG. 10, in particular, the second elastic dielectric 840 can prevent saturation of the pressure curve by starting to cause physical changes from the aforementioned critical pressure when pressurized. In other words, the second elastic dielectric 840 can expand the pressure range.

Referring to FIG. 11, the smart pad 400 according to the present disclosure can sense pressure according to pressurization when the power is turned on (S110) (S120).

At this time, the smart pad 400 can sense a pressure signal with noise removed or minimized through a pressure sensor, and generate pressure information therefrom (S130).

The smart pad 400 can transmit the generated pressure information to the display device 100. At this time, the pressure information can also be transmitted to the display device 100 through the server 500.

Meanwhile, in FIG. 11, the smart pad 400 can sense only the pressure signal with noise removed and transmit it to the display device 100 (or server 500), and extract and generate pressure information from the display device 100 (or server 500).

In this case, the S140 operation can be a pressure signal (i.e., raw data) rather than pressure information.

The pressure sensor 800 according to the present disclosure is intended to improve pressure accuracy through noise blocking on at least two sides.

The electrostatic capacitance type pressure sensor 800 according to the present disclosure described above may generate a signal when a human's body contacts or approaches. However, the pressure sensor 800 according to the present disclosure is configured so that the sensor responds only to physical pressure in order to ensure stable operation.

In this way, even when the sensor responds only to physical pressure, the contact/proximity noise signal, etc. can be excluded in order to sense only the desired pressure signal, for example, the pure pressure signal value.

For example, a signal may already be generated at the moment when a user's hand approaches the sensor and touches it before applying pressure to the pressure sensor 800. In this case, since two or more signals (for example, proximity+contact+pressure) are received together, it may not be easy to extract the pure pressure signal by distinguishing it.

Therefore, according to the above-described disclosure, even in the case where the user's body contact/proximity noise, or electrical noise (e.g., Electromagnetic Interference (EMI), Electro Static Discharge (ESD), etc.) sporadically applied from the outside occurs, it is possible to resolve it.

In addition, according to at least one of the various embodiments of the present disclosure, the sensing pressure range of the pressure sensor can be variously adjusted or expanded through the density combination of the elastic dielectrics of the first elastic dielectric 820 and the second elastic dielectric 840.

The pressure according to the present disclosure can form one electrode on the entire surface of the upper surface 810 and the lower surface 820. It is preferable that the pressure sensor 800 according to the present disclosure forms electrodes on at least two surfaces.

And as described above, an additional electrode, that is, a fifth electrode 860, 870, can be formed on the side surface as well. At this time, the fifth electrode can be configured to be connected to a single ground electrode 880 by contacting the upper and lower electrodes 810, 850 with a conductive tape having a predetermined thickness (e.g., about 5 cm or more) and shorting them. However, the present disclosure is not limited to the above-mentioned numerical value.

Accordingly, according to the present disclosure, the noise signal source can be blocked from the sensor by covering the entire surface with the ground electrode 880 regardless of the input direction, thereby allowing only a pure pressure signal to be sensed.

In other words, all or at least one of the first electrode 810, the second electrode 850, and the fifth electrode 860, 870 can be formed as ground electrodes.

The first elastic dielectric 820 may adopt a low-density sensitive material so as to cause physical changes, while the second elastic dielectric 840 may adopt a high-density material so as to be relatively insensitive to physical changes.

In addition, the second elastic dielectric 840 may function as a spacer between the second electrode 850 and may bring about additional property changes in a high-pressure range above the critical pressure.

As described above, according to at least one of the various embodiments of the present disclosure, it is possible to provide the user with accurate pressure information with noise removed, configure a multi-channel high-resolution pressure sensor to provide information on accurate pressure distribution, protect the sensor in response to external events such as static electricity, thereby contributing to improving the product life and reliability, and secure a rigid pressure sensor structure by applying a double-sided conductive fabric on the upper/lower surfaces to configure a smart pad.

Even if not specifically mentioned, the order of at least some of the operations disclosed in the present disclosure may be performed simultaneously or in a different order from the order described above, or some may be omitted/added.

According to one embodiment of the present disclosure, the above-described method can be implemented as a code that can be read by a processor on a medium in which a program is recorded. Examples of the medium that can be read by a processor include a ROM, a RAM, a CD-ROM, a magnetic tape, a floppy disk, an optical data storage device, etc.

The display device described above is not limited to the configuration and method of the embodiments described above, and the embodiments may be configured by selectively combining all or part of the embodiments so that various modifications can be made.

What is claimed is:

1. A pressure sensor comprising:

a first electrode;

a second electrode formed at a position corresponding to the first electrode;

a third electrode formed between the first electrode and the second electrode;

a fourth electrode formed at at least one end of the third electrode; and a fifth electrode connecting one end of the first electrode and one end of the second electrode, wherein the fourth electrode is a ground electrode, and wherein the fifth electrode is in contact with the fourth electrode to eliminate a noise caused in accordance with a pressure direction.

2. The pressure sensor according to claim 1, wherein the third electrode is a multi-channel signal electrode.

3. The pressure sensor according to claim 1, wherein a dielectric is formed between the first electrode and the third electrode and between the second electrode and the third electrode, respectively.

4. The pressure sensor according to claim 1, wherein the first electrode and the second electrode are formed through a conductive fabric.

5. A smart pad comprising:

a pressure sensor including:

a first electrode;

a second electrode formed at a position corresponding to the first electrode;

a third electrode formed between the first electrode and the second-electrode; and electrode;

a fourth electrode formed on at least one end of the third electrode of the pressure sensor; and a fifth electrode connecting one end of the first electrode and one end of the second electrode, wherein the fourth electrode is a ground electrode, and wherein the fifth electrode is in contact with the fourth electrode to eliminate a noise caused in accordance with a pressure direction.

6. The smart pad according to claim 5, wherein the third electrode is a multi-channel signal electrode.

7. The smart pad according to claim 5, wherein a dielectric is formed between the first electrode and the third electrode and between the second electrode and the third electrode, respectively.

8. The smart pad according to claim 5, wherein the first electrode and the second electrode are formed through a conductive fabric.

9. A display system comprising:

a smart pad including a pressure sensor which comprises a first electrode, a second electrode formed at a position corresponding to the first electrode, a third electrode formed between the first electrode and the second electrode, a fourth electrode formed on at least one end of the third electrode, and a fifth electrode connecting one end of the first electrode and one end of the second electrode; and a display device configured to process and output a signal obtained from the smart pad, wherein the fourth electrode is a ground electrode, and wherein the fifth electrode is in contact with the fourth electrode to eliminate a noise caused in accordance with a pressure direction.

* * * * *